Patented Sept. 12, 1944

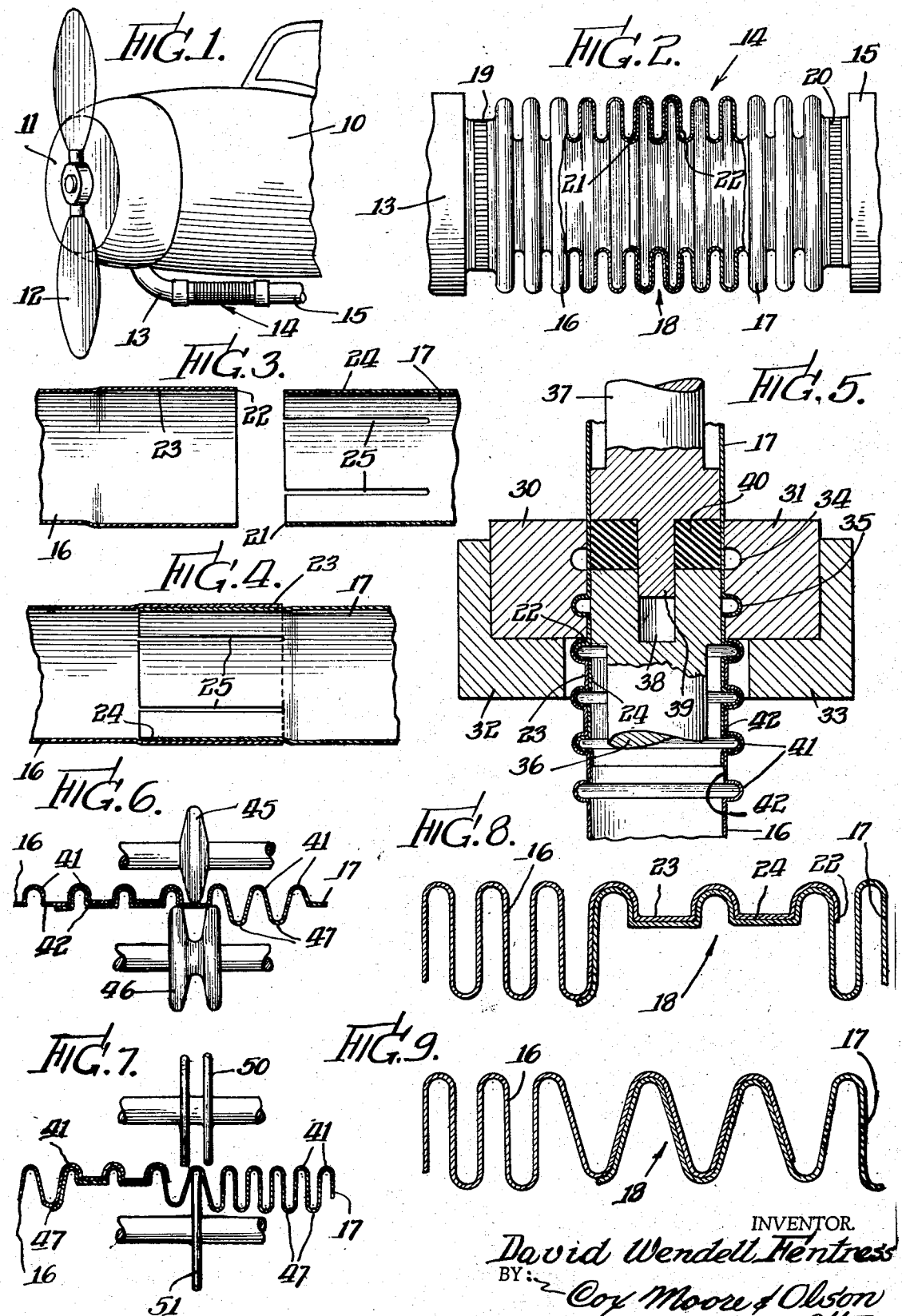

2,358,291

UNITED STATES PATENT OFFICE 2,358,291

TUBING CONSTRUCTION

David Wendell Fentress, Evanston, Ill., assignor to Chicago Metal Hose Corporation, Maywood, Ill., a corporation of Illinois Application November 15, 1940, Serial No. 365,803

8 Claims. (Cl. 285—97.1)

This invention relates to flexible metal tubing constructions, particularly of the corrugated type.

It is an object of the invention to provide new and improved flexible metal tubing or hose constructions of the corrugated type, and more particularly to provide corrugated tubing which will absorb rotational movements and stresses as well as bending and axial stresses. Conventional types of corrugated metal tubing are provided primarily for absorbing bending movements and stresses. If the tubing is thin-walled and deeply corrugated, it may also be utilized to absorb axial stresses and movements running longitudinally of the tubing. However, regardless of wall thickness or depth of corrugation corrugated metal tubing, when subjected to rotational movements and torque stresses, is soon ruptured, the tubing convolutions being incapable of absorbing such motions and stresses. In accordance with the present invention the corrugated tubing is so fabricated and constructed that in at least one point along its length relative rotational motion between the adjacent and connected tubing sections may take place as torque or rotational stresses are imparted to the tubing, whereby to permit the tubing to absorb such movements and stresses. The tubing sections are in effect swiveled on each other while at the same time maintaining at their point of juncture, fluid-tightness and the characteristics of corrugated flexible metal tubing.

A further object of the invention is to provide a corrugated tubing of the type set forth wherein the tubing convolutions at the point of juncture between the relatively movable tubing sections may be variously formed to impart to the tubing construction at the point of juncture varying degrees of fluid-tightness and varying degrees of ease of rotatability, to adapt the construction to the particular installation required. To this end, in accordance with the invention, the tubing convolutions at the point of juncture may be variously fabricated and of double-walled thickness whereby there may be provided in such convolutions the varying characteristics as set forth.

Various other objects, advantages and features of the invention will be apparent from the following specification when taken in connection with the accompanying drawing, wherein certain preferred embodiments of the invention are set forth for purposes of illustration.

In the drawing, wherein like reference numerals refer to like parts throughout:

Fig. 1 is a partial assembly view of a commercial or industrial installation illustrative of the uses to which the tubing of the present invention may be put, and specifically shows an aircraft engine installation incorporating the tubing of the invention;

Fig. 2 is a detail view, on an enlarged scale and partly in section, of the tubing illustrated in Fig. 1 and associated parts;

Figs. 3, 4 and 5 are views illustrating successive method steps utilized in the fabrication of the tubing convolutions;

Figs. 6 and 7 illustrate further method steps which may be employed;

Fig. 8 is an enlarged, detail, sectional view of a tubing construction wherein certain tubing portions at the point of juncture between the tubing sections have been fabricated by the method steps of Figs. 3, 4 and 5, and the tubing end sections have been additionally fabricated by the method steps of Figs. 6 and 7; and Fig. 9 is a view similar to Fig. 8 but showing the overlapped tubing sections additionally finished by the method step of Fig. 6.

Referring more particularly to the drawing, and first to Fig. 1 thereof, there is partially illustrated a conventional airplane structure comprising a main body or fuselage 10 carrying at its forward end an engine or motor 11 provided with a propeller 12 and an exhaust pipe 13. The exhaust pipe 13 is adapted to be connected by means of the tubing of the present invention, generally indicated by the numeral 14, to an exhaust pipe continuation 15 carried rigidly as a part of the airplane fuselage or body. As is known, in installations of this character the motor 11 is flexibly mounted upon the airplane body, and during operation, either when starting or when running, moves slightly with respect thereto. Such motion occasions relative movement between the exhaust pipe 13 carried by the motor and the continuation exhaust pipe 15 carried as a part of the airplane body. This relative movement may be a bodily shifting of the pipe 13 with respect to the pipe 15, imparting bending and longitudinal stresses and motions to the flexible tubing connection 14; and additionally the motor may rotate slightly with respect to the airplane body proper resulting in the relative rotational movements of the pipes 13 and 15 and the imparting of torque and rotational stresses and movements in the flexible connection 14. As has been heretofore stated, such torque or rotational stresses and movements, even though of only limited and seemingly insignificant amounts, result in the premature fatigue and rupture of conventional corrugated metal tubing. In accordance with the present invention the tubing is so constituted and fabricated that the characteristics of corrugated metal tubing are preserved, while at the same time providing for relative rotational movements between adjacent tubing sections in at least one point of juncture along the tubing length. It is to be understood that the installation shown in Fig. 1 is merely illustrative, and that the tubing of the present invention may be used in various installations requiring the absorption of torque and rotational stresses and motions, installations requiring greater or lesser degrees and ease of rotational motion, and varying degrees of fluid-tightness.

Referring to Fig. 2, it will be seen that the flexible tubing construction 14 is of the annular corrugated type, and comprises at least two sections of annular corrugated tubing 16 and 17 coupled together in a fluid-tight manner, but for relative rotational or swivel motion, at a point of juncture generally indicated by the reference numeral 18. The tubing section 16 is secured rigidly to the motor exhaust pipe 13 by any suitable coupling means, for example, by circular welding as indicated at 19, and the corrugated tubing section 17 is similarly rigidly connected to the continuation exhaust pipe 15, as by circular welding as indicated at 20.

The juncture point 18, as illustrated, comprises at least a plurality of corrugated convolutions in overlapping relation, the extreme end 21 of the inner tubing section 17 terminating at the base of the trough of the tubing convolution, and the extreme end 22 of the outer tubing section 16 terminating adjacent the base of the trough, as shown. The number of overlapped convolutions, determining the length of the double-wall thickness point of juncture between the tubing sections, may be varied to suit the particular installation, an increase in the number of overlapped convolutions resulting in an increase in fluid-tightness and a decrease in the ease of relative rotatability between the two tubing sections. These factors of fluid-tightness and ease of rotatability are also dependent upon the shape of the overlapped tubing convolutions at the point of juncture and the degree of corrugation imparted thereto, as will be hereinafter more specifically set forth.

The initial steps in fabricating the corrugated tubing structure are illustrated in Figs. 3 and 4, it being understood that the tubing sections 16 and 17 are fabricated from the same size stock, preferably thin-walled seamless tubing. As shown in Fig. 3, the tubing section 16, the end of which is to overlie the tubing section 17 at the juncture point, is preferably expanded slightly along a predetermined end length as indicated at 23. The length of the end section which is expanded is determined by the amount of overlap desired at the point of juncture in the finished connection. The tubing end may be expanded by any suitable means such, for example, as by drawing it over a mandrel or the like, not shown. The operation is facilitated by reason of the fact that only a slight expansion is required, and in certain instances the expanding step may be omitted, if desired. Preferably, however, the end 23 of the tubing 16 which is to overlie the tubing section 17 is expanded an amount so that its inner diameter is just slightly smaller than the original outside diameter of the tubing. By this means the interfitting of the tubing ends is facilitated while at the same time a tight and resilient fit between them is maintained, as will presently appear.

To further facilitate the interengagement of the tubing ends, the end section 24 of the tubing section 17 is slotted as indicated at 25 by means of suitable saw-cuts or the like, the cuts extending axially of the tubing end a length equal to the expanded length on the end of the tubing section 16. These cuts, four in number in the particular embodiment shown, being made with a saw or the like, actually effect a removal of the material of the tubing in an amount corresponding to the width of the cut. Accordingly as the tubing 17 is fitted into the tubing 16, as shown in Fig. 4, the end section 24 thereof will be radially contracted slightly, the slots 25 being slightly contracted and the tubing wall sections between the slots providing resilient tongue sections maintaining themselves in firm resilient engagement with the inner wall of the end section 23 of the tubing 16. If the end section of the tubing 16 is not expanded, the slots 25 in the tubing 17 may be relied upon to absorb the entire necessary radial contraction of the tubing end section 24. The expansion of the tubing section 23, however, decreases the amount of collapse and resultant stress of the metal fibers required of the tubing end section 24.

After the interfitting of the tubing sections, as previously described, the joined sections are applied to the corrugating apparatus diagrammatically illustrated in Fig. 5 which effects the formation of corrugations along the length of the tubing. This apparatus, and also additional apparatus hereinafter to be described, may be of the general type described in the patent to A. Dreyer, No. 1,879,663, dated September 27, 1932. In general it comprises a split die consisting of two horizontally separable complementary die members 30 and 31 mounted in split holder members 32 and 33. The dies 30 and 31 when in contacting or engaged position, provide two annular recesses 34 and 35. The apparatus also includes a lower plunger member 36 and an upper plunger member 37, the lower plunger member being provided with a recess 38 into which a centrally extending projection 39 on the upper plunger member is adapted to project. A ring of flexible plastic material, such as rubber or the like, is arranged between the operating faces of the plungers 36 and 37, and adapted to be compressed thereby.

In the operation of this corrugating apparatus the tubing sections 16 and 17, interfitted at their ends as previously described, are arranged between the split die members 30 and 31, and the die members then contracted into gripping engagement with the tubing. As the lower plunger 36 is then held stationary and the upper plunger 37 depressed, the rubber ring 40 will be axially compressed and radially expanded into the die recess 34 forming an annular convolution in the tubing wall. The plunger 37 is thereupon retracted, the die members opened, and the tubing pieces readjusted within the die so that the formed convolution is alined with the recess 35, after which the dies are again contracted and the plunger 37 operated to form a second convolution in the annular die recess 34. This operation may be repeated to form outwardly extending convolutions at spaced intervals along the entire length of the tubing or along such tubing length as may be desired. When the tubing has been thus processed, it is in effect simi-corrugated, being provided with outwardly extending annular corrugations 41 at spaced intervals connected by non-corrugated or straight sections 42. In accordance with the invention, the foregoing corrugating process is performed along the length of the tubing sections 16 and 17 as well as along the overlapped end sections 23 and 24 thereof. The length of the overlapped end sections may be proportioned in a manner so that the extreme end 22 of the tubing 16 lies at the end of one of the outwardly extending corrugations 41, as best shown in Figs. 5 and 8.

After the formation of the spaced outwardly extending corrugations, as above described, the tubings 16 and 17 on either side of their overlapped point of juncture may be further processed by apparatus, for example, as illustrated in Figs. 6 and 7. In Fig. 6 there is illustrated a pair of cooperating rollers 45 and 46 adapted to engage the straight or uncorrugated tubing sections 42 and inwardly form the same to form a series of inwardly extending corrugations 47 between the outwardly extending corrugations 41. When the corrugations have been thus processed, the tubing is both inwardly and outwardly corrugated, but the wall sections of the corrugations are tapered.

In Fig. 7 a further pair of rollers 50 and 51 are provided so shaped that when they are brought into cooperative engagement with the tubing, they will contract the tapered wall sections of the tubing convolutions into straight or radially extending sections.

A tubing construction thus fabricated is illustrated in Fig. 8, the body sections of the tubings 16 and 17 being completely corrugated by apparatus such as shown in Figs. 6 and 7, whereas the overlapped end sections of the tubings at the point of juncture 18 remain in only partially corrugated form, as finished by the apparatus of Fig. 5. In Fig. 8 a form of connection is illustrated wherein the overlapped juncture point of the tubings is finished by the apparatus of Fig. 6. In Fig. 2, previously described, the complete corrugating apparatus is applied to the point of juncture as well as to the other portions of the tubing whereby to completely and fully corrugate the tubing structure along its entire length.

It will thus be seen that in accordance with the invention the several method steps provide for the finishing of the point of juncture between the tubing pieces in various ways to facilitate the particular installation to which the flexible tubing connection is to be applied. More specifically, where the point of juncture of the tubing ends is in the form shown in Fig. 8, minimum fluid-tightness is provided, but a juncture connection between the two tubing ends is made which readily permits relative swivel or rotational movements. Such arrangement would be used in installations requiring minimum fluid-tightness and maximum ease of relative rotatability. The embodiment of Fig. 9 provides a greater fluid-tightness with somewhat less ease of relative swivel movement between the tubing pieces, whereas the embodiment of Fig. 2 provides maximum fluid-tightness and minimum ease of relative rotational movement. However, even the embodiment of Fig. 2 is adapted to readily absorb torque or rotative movements between the tubing pieces without fatigue or undue stress of the metal structures, and such rotative movements may be anything from a few degrees up to the full 360 degrees of rotation. Conversely, even the embodiment of Fig. 8 provides a fluid-tightness sufficient for most non-pressure installations, for example, exhaust pipe connections and the like. In this connection it is to be noted that the resilient engagement of the tongue-like portions on the end section 24 of the tubing 17 against the inner wall of the end section 23 of the tubing 16 provides for a maintained and effective fluid-tight seal between the parts. While a snug engagement is provided, there is no binding such as would interfere with the relative rotational or swivel movements of the tubing pieces 16 and 17 with respect to each other. In other words, the slots 25 impart resiliency to the tongue sections between the slots, which provides for the maintained engagement of the parts but without uncontrolled binding action. It is to be understood that the interengagement of the tubings may be so proportioned that the extreme ends 21 and 22 thereof terminate with respect to the cross section of the convolutions, at a point suited to the particular convolution shape employed.

It is obvious that various changes may be made in the specific embodiments of the invention set forth for purposes of illustration without departing from the spirit of the invention. The invention is accordingly not to be limited to the precise embodiments shown and described, but only as indicated in the following claims.

The invention is hereby claimed as follows:

1. A flexible tubing construction comprising a pair of tubing members, said members being telescoped one within the other for a predetermined distance at their ends whereby to provide an overlapping juncture section, and said tubing members being annularly corrugated at their juncture point and on either side thereof, the tubing members being relatively rotatably swivelled and the corrugations at the juncture point serving to permit such relative rotation between the tubing members while preventing axial separation thereof.

2. A flexible tubing structure comprising a pair of tubing members of substantially equal diameter, one of said members having its end split a predetermined axial distance whereby to provide a plurality of circumferentially disposed radially resilient tongue sections on said tubing end, and said tubing end being telescoped within the end of the other tubing member whereby to provide an overlapping point of juncture, and said tubing members being corrugated at their juncture point and on either side thereof, the corrugations at the juncture point and the resiliency of the tongue sections serving to permit relative rotation between the tubing members while preventing axial separation thereof.

3. A flexible tubing construction comprising a pair of tubing members of substantially equal diameter, the end of one of said tubing members being split a predetermined axial distance whereby to provide a plurality of radially resilient circumferentially disposed tongue sections, and an end of the other tubing member being radially expanded and arranged in overlapping telescoping relation with the split tubing end whereby to provide an overlapping juncture point connecting the tubing members, and said tubing members being corrugated at their juncture point whereby to permit of relative rotation between the tubing members without the axial separation thereof.

4. A flexible tubing construction as defined in claim 1 wherein the corrugations at the juncture point between the tubing members are of the same cross sectional contour as the corrugations in the tubing members on either side of the juncture point.

5. A flexible tubing construction as defined in claim 1 wherein the corrugations at the juncture point between the tubing members are of different cross sectional contour than the corrugations in the tubing members on either side of the juncture point.

6. A flexible tubing construction as defined in claim 1 wherein the corrugations at the juncture point between the tubing members are semi-corrugations and the corrugations in the tubing members on either side of the juncture point are full corrugations.

7. A flexible tubing construction comprising a pair of tubing members, said members being telescoped one within the other for a predetermined distance at their ends whereby to provide an overlapping juncture section, and said tubing members being annularly corrugated at their juncture point and on at least one side thereof, the tubing members being relatively rotatably swivelled and the corrugations at the juncture point serving to permit such relative rotation between the tubing members while preventing axial separation thereof.

8. A flexible tubing construction comprising a pair of tubing members, said members being telescoped one within the other for a predetermined distance at their ends whereby to provide an overlapping juncture section, and said tubing members being provided with corrugations of uniform cross sectional contour at their juncture point and on at least one side thereof, the tubing members being relatively rotatably swivelled and the corrugations at the juncture point serving to permit such relative rotation between the tubing members.

DAVID WENDELL FENTRESS.